United States Patent
Huang et al.

(10) Patent No.: US 9,979,495 B2
(45) Date of Patent: May 22, 2018

(54) APPARATUS, SYSTEM AND METHOD FOR WIRELESS BATCH CALIBRATION

(71) Applicant: Industrial Technology Research Institute, Hsinchu (TW)

(72) Inventors: Shih-Tung Huang, Tainan (TW); Shui-An Wen, Taichung (TW); Chun-Chih Chen, Taipei (TW); Shing-Wu Tung, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 184 days.

(21) Appl. No.: 14/968,775

(22) Filed: Dec. 14, 2015

(65) Prior Publication Data

US 2016/0380710 A1 Dec. 29, 2016

(30) Foreign Application Priority Data

Jun. 25, 2015 (TW) .............................. 104120472 A

(51) Int. Cl.
*H04W 4/00* (2018.01)
*H04B 17/12* (2015.01)
*H04B 17/21* (2015.01)

(52) U.S. Cl.
CPC ............. *H04B 17/12* (2015.01); *H04B 17/21* (2015.01)

(58) Field of Classification Search
CPC ................................. H04B 17/12; H04B 17/21
(Continued)

(56) References Cited

U.S. PATENT DOCUMENTS

| 8,257,189 B2 | 9/2012 | Koudele et al. |
| 8,979,758 B2 | 3/2015 | Stein et al. |

(Continued)

FOREIGN PATENT DOCUMENTS

| TW | 353850 | 3/1999 |
| TW | 200505194 | 2/2005 |

(Continued)

OTHER PUBLICATIONS

Hung, San-Shan et al., "Packaged Wireless Multisensor Module Embedded Reinforced Concrete for Monitoring Construction Characteristics," Electronic Packaging Technology & High Density Packaging, Aug. 2010, pp. 1293-1296, IEEE, US.

(Continued)

*Primary Examiner* — Chuong T Ho

(57) ABSTRACT

A wireless batch calibration apparatus, a wireless batch calibration system and a wireless batch calibration method. The wireless batch calibration apparatus includes a wireless transceiver, a processor circuit and a storage circuit. The wireless batch calibration apparatus receives a reference signal from a golden sample and a to-be-calibrated signal from each of a plurality of to-be-calibrated devices. The wireless batch calibration apparatus calculates the compensation value of each to-be-calibrated device, generating a compensation polynomial according to the compensation value and a calibration precision of each to-be-calibrated device, and establishes a calibration table. The wireless batch calibration apparatus writes the compensation polynomial and a setting bit back to each to-be-calibrated device, and completes the batch calibration of a plurality of to-be-calibrated devices.

23 Claims, 7 Drawing Sheets

(58) Field of Classification Search
USPC .................................... 370/241, 241.1, 242
See application file for complete search history.

(56) References Cited

U.S. PATENT DOCUMENTS

| | | | |
|---|---|---|---|
| 8,983,568 | B2 | 3/2015 | Bommakanti et al. |
| 8,986,205 | B2 | 3/2015 | Buja |
| 8,986,207 | B2 | 3/2015 | Li et al. |
| 8,986,208 | B2 | 3/2015 | Hayter et al. |
| 8,993,331 | B2 | 3/2015 | Nekoomaram et al. |
| 8,997,550 | B2 | 4/2015 | Smith et al. |
| 9,000,910 | B2 | 4/2015 | Arunachalam |
| 9,001,712 | B2 | 4/2015 | Viswanathan et al. |
| 9,002,390 | B2 | 4/2015 | San Vicente et al. |
| 2004/0188518 | A1* | 9/2004 | McDonald ............ H01S 5/0014 235/382 |
| 2005/0047536 | A1 | 3/2005 | Wu et al. |
| 2008/0200135 | A1 | 8/2008 | Chung |
| 2009/0054016 | A1* | 2/2009 | Waheed ................ H03F 1/3247 455/114.3 |
| 2009/0253526 | A1 | 10/2009 | Koudele et al. |
| 2011/0045787 | A1* | 2/2011 | Jin ........................ H04W 52/42 455/114.3 |
| 2012/0044355 | A1* | 2/2012 | Jamtgaard ................ G01S 5/00 348/159 |
| 2012/0309553 | A1 | 12/2012 | Koudele et al. |
| 2013/0288610 | A1* | 10/2013 | Toh ...................... H03G 3/3042 455/67.14 |

FOREIGN PATENT DOCUMENTS

| | | |
|---|---|---|
| TW | 201023543 | 6/2010 |
| TW | I362714 | 4/2012 |
| TW | 201301823 | 1/2013 |
| TW | I392839 | 4/2013 |
| TW | I443485 | 7/2014 |
| TW | M493046 | 1/2015 |

OTHER PUBLICATIONS

Han, Yulin et al., "Fast Calibration of Wireless and Passive Temperature Sensors Based on SAW Resonators," Frequency Control Symposium, May 2014, pp. 1-4, IEEE, US.

Kalinin, V., "Calibration of Non-Contact Temperature-compensated SAW Resonant Torque Sensors," Frequency Control and the European Frequency and Time Forum, May 2011, pp. 1-6, IEEE, US.

Leng, Yi et al., "A High Accuracy Signal Conditioning Method and Sensor Calibration System for Wireless Sensor in Automotive Tire Pressure Monitoring System," Wireless Communications, Networking and Mobile Computing, Sep. 2007, pp. 1833-1837, IEEE, US.

Wongwirat, Olarn et al., "Prototype Development of Hybrid Temperature Recorder Monitoring System," Control Automation Robotics & Vision, Dec. 2010, pp. 1045-1050, IEEE, US.

Oonchom, Keelati et al., "A Development of Hybrid Temperature Recorder Monitoring System," Control Automation and Systems, Oct. 2010, pp. 271-275, IEEE, US.

Wongwirat, Olarn et al., "Operation Verification of Hybrid Temperature Recorder Monitoring System," Mechatronics and Automation, Aug. 2011, pp. 1526-1531, IEEE, US.

Jeong et al., "A Fully-Integrated 71 nW CMOS Temperature Sensor for Low Power Wireless Sensor Nodes," IEEE Journal of Solid-State Circuits, Jun. 2014, pp. 1682-1693, vol. 49, Issue 8, IEEE, US.

Vaz, A. et al., "Full Passive UHF Tag With a Temperature Sensor Suitable for Human Body Temperature Monitoring," Circuits and Systems II, Feb. 2010, pp. 95-99, vol. 57, Issue 2, IEEE, US.

Opasjumruskit et al., "Self-Powered Wireless Temperature Sensors Exploit RFID Technology," Pervasive Computing, Jan. 2006, pp. 54-61, vol. 5, Issue 1, IEEE, US.

Yin, Jun et al., "A System-on-Chip EPC Gen-2 Passive UHF RFID Tag With Embedded Temperature Sensor," IEEE Journal of Solid-State Circuits, Oct. 2010, pp. 2404-2420, vol. 45, Issue 11, IEEE, US.

Taiwan Patetn Office, Office Action, Patent Application Serial No. 104120472, dated Feb. 15, 2016, Taiwan.

* cited by examiner

200

| Device Name | MAC addresses | signal parameters | compensation polynomials | complete calibration |
|---|---|---|---|---|
| reference apparatus 111 | 00-01-80-ee-48-ac | 10.35 | N | N |
| to-be-calibrated device 113a | 00-01-80-ee-8f-ab | 8.35 | -2 | N |
| to-be-calibrated device 113b | 00-01-80-ee-8f-cd | 20 | 9.65 | N |
| to-be-calibrated device 113c | 00-01-80-ee-8f-ef | 10 | -0.35 | Y |
| ⋮ | ⋮ | ⋮ | ⋮ | ⋮ |
| to-be-calibrated device 113n | 00-01-80-ee-8f-ij | 9 | -1.35 | N |

FIG. 2

APPARATUS, SYSTEM AND METHOD FOR WIRELESS BATCH CALIBRATION

CROSS REFERENCE TO RELATED APPLICATIONS

This Application claims priority of Taiwan Patent Application No. 104120472, filed on Jun. 25, 2015, the entirety of which is incorporated by reference herein.

BACKGROUND OF THE DISCLOSURE

Field of the Disclosure

The present disclosure relates to a wireless batch calibration apparatus, system, and method.

Description of the Related Art

Generally, electronic products designed to sense parameters such as temperature, humidity, and brightness need to be calibrated to avoid problems during the manufacturing process and before shipping.

Take a humidity sensor, for example. During a calibration procedure that is performed prior to shipping, a reference humidity sensor and at least one to-be-calibrated humidity sensor are placed in a room with constant humidity, then the reference humidity sensor and the to-be-calibrated humidity sensor are manually connected to a calibration device to read data from the reference humidity sensor and the to-be-calibrated humidity sensor, in order to calculate a calibration value. Then, the calibration value is set into the to-be-calibrated humidity sensor, and the to-be-calibrated humidity sensor is disconnected from the calibration device. The manual calibration procedure for each to-be-calibrated product wastes 7 to 8 minutes.

Therefore, it is important to speed up the calibration procedure for to-be-calibrated products and get a reliable calibration result.

BRIEF SUMMARY OF THE DISCLOSURE

Embodiments of the disclosure provide a wireless batch calibration apparatus, system and method.

One embodiment of the disclosure provides a wireless batch calibration apparatus. The wireless batch calibration apparatus comprises a wireless transceiver, a processor circuit, and a storage circuit. The wireless transceiver is wirelessly connected to a reference apparatus and a plurality of to-be-calibrated devices in a calibration area, and receives the reference signal of the reference apparatus and the to-be-calibrated signal of each to-be-calibrated device. The processor circuit is coupled to the wireless transceiver, calculates the compensation value of each to-be-calibrated device according to the reference signal and the to-be-calibrated signal, generates a compensation polynomial according to the compensation value and a calibration precision of each to-be-calibrated device, and establishes a calibration table to write the compensation polynomial of each to-be-calibrated device and a setting bit back to each to-be-calibrated device. The storage circuit is coupled to the processor circuit to store the calibration table.

Another embodiment of the disclosure provides a wireless batch calibration method for a wireless batch calibration apparatus. The wireless batch calibration method comprises steps of: wirelessly connecting to a reference apparatus in a calibration area to read the reference signal of the reference apparatus; wirelessly connecting to a plurality of to-be-calibrated devices in the calibration area to read the to-be-calibrated signal of each to-be-calibrated device; estimating a compensation value for each to-be-calibrated device according to the reference signal and the to-be-calibrated signal of each to-be-calibrated device, generating a compensation polynomial according to the compensation value and the calibration precision of each to-be-calibrated device, and establishing a calibration table; writing the compensation polynomial of each to-be-calibrated device and a setting bit back to each to-be-calibrated device; and determining whether any of the to-be-calibrated devices is not calibrated according to the calibration table.

Another embodiment of the disclosure provides a wireless batch calibration system. The wireless batch calibration system comprises a reference apparatus and a plurality of to-be-calibrated devices in a calibration area, and a wireless batch calibration apparatus. The wireless batch calibration apparatus is wirelessly connected to the reference apparatus and the to-be-calibrated devices within the calibration area. The wireless batch calibration apparatus comprises a wireless transceiver t, a processor circuit, and a storage circuit. The wireless transceiver is wirelessly connected to a reference apparatus and a plurality of to-be-calibrated devices in a calibration area, and receives the reference signal of the reference apparatus and the to-be-calibrated signal of each to-be-calibrated device. The processor circuit is coupled to the wireless transceiver, calculates a compensation value for each to-be-calibrated device according to the reference signal and the to-be-calibrated signal, generates a compensation polynomial according to the compensation value and a calibration precision of each to-be-calibrated device, and establishes a calibration table to write the compensation polynomial of each to-be-calibrated device and a setting bit back to each to-be-calibrated device. The storage circuit is coupled to the processor circuit to store the calibration table.

A detailed description is given in the following embodiments with reference to the accompanying drawings.

BRIEF DESCRIPTION OF THE DRAWINGS

The present disclosure can be more fully understood by reading the subsequent detailed description and examples with references made to the accompanying drawings, wherein:

FIG. 2 is a schematic diagram of a calibration table according to an embodiment of the disclosure.

DESCRIPTION OF EMBODIMENTS

Figure 1:
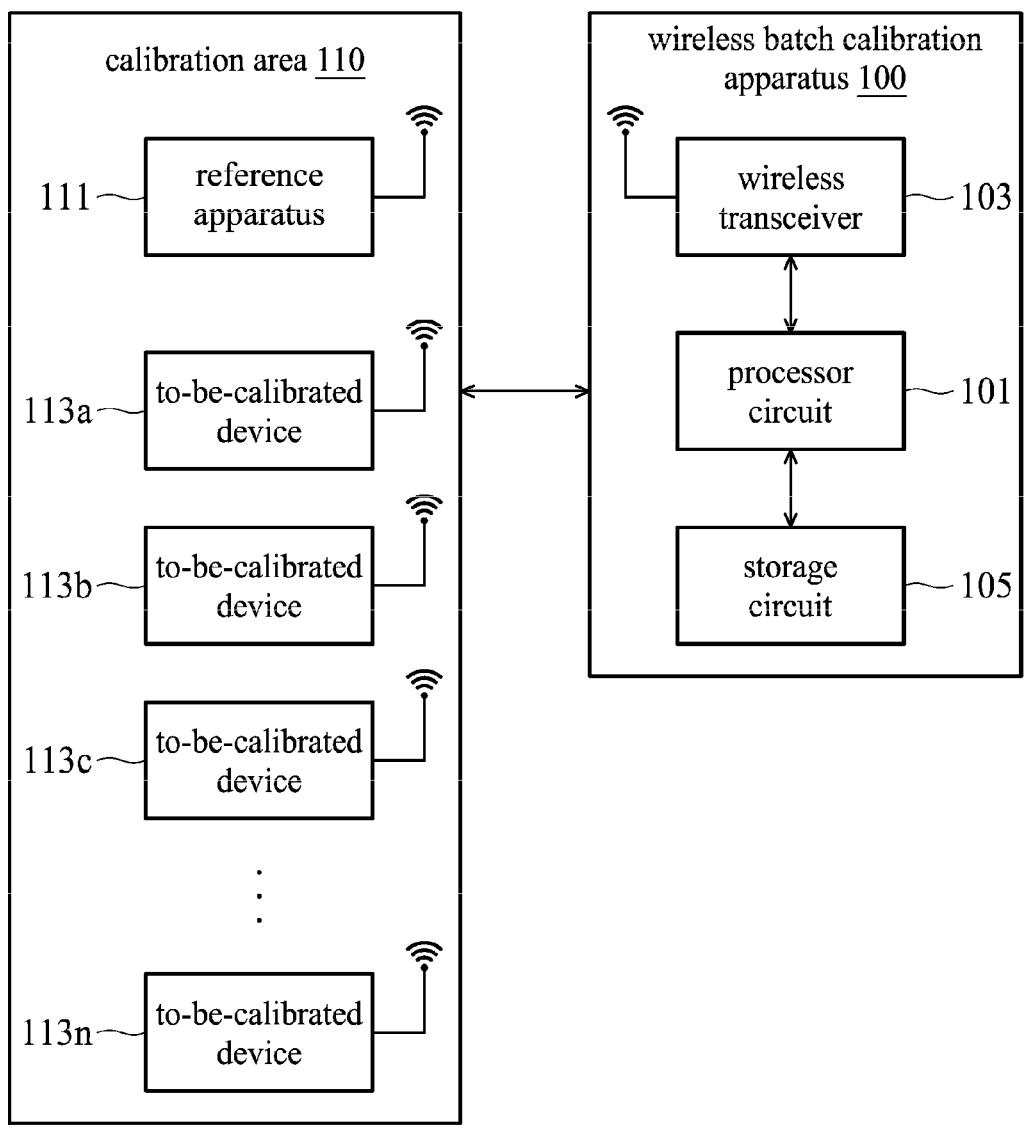
FIG. 1 is a schematic diagram of a wireless batch calibration system according to an embodiment of the disclosure.

The following description is of the best-contemplated mode of carrying out the disclosure. This description is made for the purpose of illustrating the general principles of the disclosure and should not be taken in a limiting sense. The scope of the disclosure is best determined by reference to the appended claims.

Exemplary embodiments of the present disclosure may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

FIG. 1 is a schematic diagram of a wireless batch calibration system according to an embodiment of the disclosure.

Please refer to FIG. 1. The wireless batch calibration system 1 comprises a wireless batch calibration apparatus 100 and a calibration area 110. The wireless batch calibration apparatus 100 comprises at least a processor circuit 101, a wireless transceiver 103 and a storage circuit 106, and the elements of the wireless batch calibration apparatus 100 are not limited to the elements disclosed. The calibration area 110 comprises a reference apparatus 111 and a plurality of to-be-calibrated devices 113a~413n.

In this embodiment, the wireless batch calibration apparatus 100 may be a server, a desktop computer, a laptop, a network-connected computer, a PDA (personal digital assistant), a personal computer (PC), a scanner, a television, or a wireless sensor.

In this embodiment, the wireless batch calibration apparatus 100 of the wireless batch calibration system 1 can execute calibration procedures for the to-be-calibrated devices 113a~413n within the calibration area 110. The wireless transceiver 103 of the wireless batch calibration apparatus 100 is wirelessly connected to the reference apparatus 111 and the to-be-calibrated devices 113a~413n within the calibration area 110 to receive a reference signal from the reference apparatus 111 and to-be-calibrated signals from the to-be-calibrated devices 113a~113n. The reference apparatus 111 and the to-be-calibrated devices 113a~413n have a wireless communication function to wirelessly connect to the wireless batch calibration apparatus 100 and exchange information with the wireless batch calibration apparatus 100. The reference apparatus 111 is a golden sample, and the reference signal output by the reference apparatus 111 serves as a standard sample signal within the calibration area 110. The to-be-calibrated devices 113a~413n within the calibration area 110 are calibrated according to the reference signal of the reference apparatus 111.

In one embodiment, the wireless transceiver 103 executes a wireless detection procedure and a wireless connection procedure according to the name of the to-be-calibrated device. When the wireless transceiver 103 detects the correct name of the to-be-calibrated device, the wireless transceiver 103 then wirelessly connects to the to-be-calibrated device. This can avoid the wireless batch calibration apparatus 100 connecting to unnecessary devices.

The processor circuit 101 is coupled to the wireless transceiver 103. The processor circuit 101 calculates each compensation value of each to-be-calibrated device 113a~413n according to the reference signal of the reference apparatus 111 and the to-be-calibrated signal of each to-be-calibrated device 113a~413n. The processor circuit 101 generates a compensation polynomial of each to-be-calibrated device 113a~413n according to the compensation value and calibration precision of each to-be-calibrated device 113a~413n, and establishes a calibration table. The processor circuit 101 writes the compensation polynomial of each to-be-calibrated device 113a~413n and a setting bit back to to-be-calibrated devices 113a~413n and updates the calibration table. Thus, the wireless batch calibration apparatus 100 can batch calibrate the to-be-calibrated device 113a~113n according to the calibration table.

In one embodiment, the processor circuit 101 calculates the compensation value of each of the to-be-calibrated devices 113a~113n by subtracting the reference signal of the reference apparatus 111 from each to-be-calibrated signal of each to-be-calibrated device 113a~413n. The compensation value is determined according to the difference.

In this embodiment, the setting bit is an enable bit. Note that when the to-be-calibrated signal of each to-be-calibrated device 113a~413n is not correct and needs to be calibrated, the to-be-calibrated devices 113a~413n do not overwrite the original to-be-calibrated signal of each to-be-calibrated device 113a~413n when receiving compensation values. The to-be-calibrated devices 113a~413n add the compensation values to the to-be-calibrated signal of each to-be-calibrated device 113a~413n. Thus, the enable bit is used to determine whether the to-be-calibrated devices 113a~113n need to enable the calibration of the compensation values. According to the mechanism, when the wireless batch calibration apparatus 100 writes the compensation polynomial of each of the to-be-calibrated devices 113a~413n and a setting bit back to to-be-calibrated devices 113a~413n, only one writing operation is required to write the setting bit and the compensation value to the to-be-calibrated devices 113a~413n to complete the calibration of the to-be-calibrated devices 113a~413n. The mechanism can help the wireless batch calibration apparatus 100 not to write the compensation polynomial and the setting bit to the to-be-calibrated devices 113a~413n in two writing operations.

In this embodiment, the compensation polynomial can be expressed as:

$$Y(X)=C_n X^n + C_{n-1} X^{n-1} + \ldots C_0$$

wherein Y(X) is the compensation value of each to-be-calibrated device 113a~413n, X is calibration precision, and $C_0$~$C_n$ are parameters of the calibration precision X. When the calibration error of the to-be-calibrated device 113a~113n needs to be accurate to the decimal point, the calibration precision can be a value less than 1, such as 0.1. When tolerance of the calibration error of a to-be-calibrated device 113a~113n is large, the calibration precision can be a value larger than 1, such as 2. Note that a person skilled in the art can set the value of the calibration precision X according to requirements and teaching from the present disclosure, and the value of the calibration precision X is not limited to the disclosed examples.

According to the mechanism, when the wireless batch calibration apparatus 100 writes the compensation polynomial of each of the to-be-calibrated devices 113a~413n and a setting bit back to to-be-calibrated devices 113a~413n, only one writing operation is required to write the setting bit and the compensation value to the to-be-calibrated devices 113a~413n to complete the calibration of the to-be-calibrated devices 113a~413n. The mechanism can help the wireless batch calibration apparatus 100 not to write the compensation polynomial and the setting bit to the to-be-calibrated devices 113a~413n in two writing operations.

The storage circuit 105 is coupled to the processor circuit 101 to store data, code or a calibration table.

The processor circuit 101 may be a central processing unit (CPU), a microprocessor or an embedded controller. The function of the processor circuit 101 can be implemented by microprocessor, micro controller, DSP chip, FPGA or another programmable design unit. The function of the processor 101 can be also implemented by an independent electronic device or IC, and the function of the processor 101 can be implemented by hardware or software.

The storage circuit 105 may be a memory, an SRAM (Static Random-Access Memory), a DRAM (Dynamic Random Access Memory), a hard drive, or another storage medium.

FIG. 2 is a schematic diagram of a calibration table according to an embodiment of the disclosure. In this embodiment, the processor circuit 101 establishes the calibration table 200 according to the reference signal of the reference apparatus 111 and the to-be-calibrated signals of the to-be-calibrated devices 113a~413n. The calibration table 200 comprises at least a field of MAC (Media Access Control) addresses, a field of signal parameters, a field of compensation polynomials, and a field of complete calibrations. The field of MAC stores the MAC addresses of the reference apparatus 111 and the to-be-calibrated devices 113a~413n. The field of signal parameters stores the reference signal received by the wireless batch calibration apparatus 100 and the to-be-calibrated signals. The field of compensation polynomial stores the compensation polynomial calculated by the processor circuit 101. The field of complete calibration stores information indicating whether the to-be-calibrated devices 113a~413n have completed the calibration.

In other words, the processor circuits 101 records the MAC address of the reference apparatus 111, the reference signal, the MAC addresses of the to-be-calibrated devices 113a~413n, the to-be-calibrated signals, the compensation polynomial, and information indicating whether the to-be-calibrated devices have completed the calibration to the field of MAC addresses, the field of signal parameters, the field of compensation polynomials and the field of complete calibrations of the calibration table 200, respectively.

Based on the calibration table 200, the wireless batch calibration apparatus 100 writes the compensation polynomial and the setting bit to each to-be-calibrated device 113a~413n via the wireless transceiver 103 according to content in the MAC address field of each to-be-calibrated device 113a~413n, the compensation polynomial field and complete calibration field of the calibration table 200, wherein the setting bit is an enable bit. Thus, the wireless batch calibration apparatus 100 can simultaneously calibrate the to-be-calibrated devices 113a~413n and update data stored in the complete calibration field of the calibration table 200 according to the to-be-calibrated devices 113a~413n that have completed the calibration procedure. In this embodiment, after each of the to-be-calibrated devices 113a~413n receives the compensation polynomial and the setting bit from the wireless batch calibration apparatus 100, the to-be-calibrated signal of each to-be-calibrated device 113a~413n is calibrated according to the setting bit (enable bit) and the compensation value of the compensation polynomial when the setting bit is enabled. In another embodiment, the calibration table 200 further comprises an device name field recording the names of the reference apparatus 111 and the to-be-calibrated devices 113a~413n.

Please refer to FIG. 2. The reference signal of the reference apparatus 111 is 10.35, which means that the calibration error of each to-be-calibrated device 113a~413n needs to be accurate to two decimal places. The value of the calibration precision X of the compensation polynomial is set to 0.1, the parameters of the calibration precision X, $C_0$~$C_n$, are set to between −9 and 9. In this embodiment, the to-be-calibrated signal of the to-be-calibrated device 113a is 8.35. The compensation value calculated by subtracting the reference signal from the to-be-calibrated signal is 2 (8.35−10.35=2). Thus, the corresponding compensation polynomial is: $Y(X)=C_0=-2$.

The to-be-calibrated signal of the to-be-calibrated device 113b is 20. The compensation value calculated by subtracting the reference signal from the to-be-calibrated signal is 9.65 (20−10.35=9.65). Thus, the corresponding compensation polynomial is:

$$Y(X)=C_2X^2+C_1X^1+C_0=5(0.1)^2+6(0.1)^1+9=9.65$$

The to-be-calibrated signal of the to-be-calibrated device 113c is 10. The compensation value calculated by subtracting the reference signal from the to-be-calibrated signal is −0.35 (10−10.35=−0.35). Thus, the corresponding compensation polynomial is:

$$Y(X)=C_2X^2+C_1C^1+C_0=(-5)(0.1)^2+(-3)(0.1)^1+0=-0.35$$

The to-be-calibrated signal of the to-be-calibrated device 113n is 9. The compensation value calculated by subtracting the reference signal from the to-be-calibrated signal is −1.35 (9−10.35=−1.35). Thus, the corresponding compensation polynomial is:

$$Y(X)=C_2X^2+C_1X^1+C_0=(-5)(0.1)^2+(-3)(0.1)^1+(-1)=-1.35$$

In one embodiment, the positive/negative symbol of parameters of the calibration precision X, i.e., $C_0$~$C_1$, and the setting bit can be arranged with the values of parameters of the calibration precision X, i.e., $C_0$~$C_n$, in the same byte. In another embodiment, the positive/negative symbol of parameters of the calibration precision X, i.e., $C_0$~$C_n$, and the setting bit can be arranged in one byte and the values of parameters of the calibration precision X, i.e., $C_0$~$C_n$, is stored in another byte.

Figure 3:
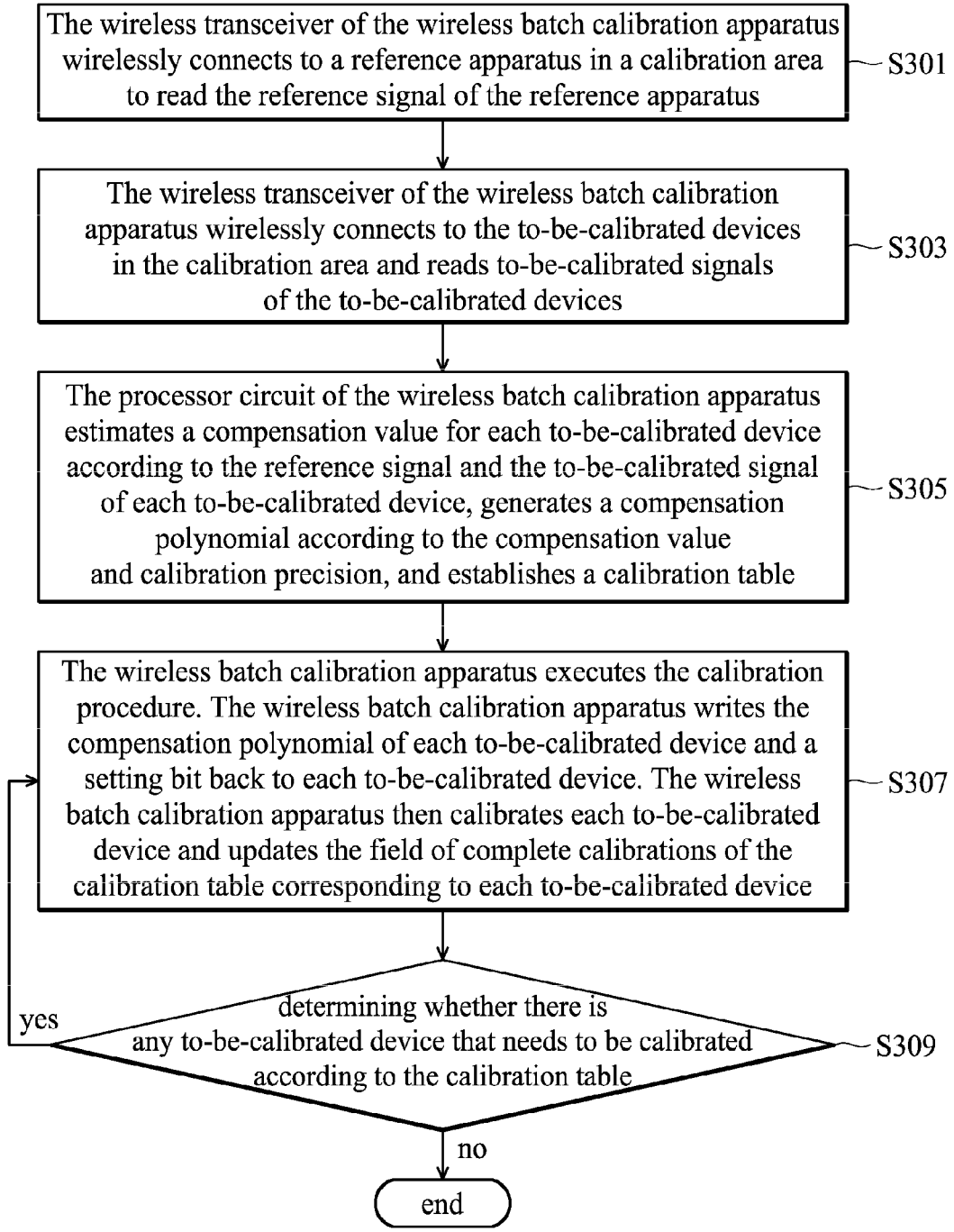
FIG. 3 is a flow chart of a wireless batch calibration method according to an embodiment of the disclosure.

FIG. 3 is a flow chart of a wireless batch calibration method according to an embodiment of the disclosure.

Please refer to FIG. 3 and FIG. 1. In step S301, the wireless transceiver 103 of the wireless batch calibration apparatus 100 wirelessly connects to a reference apparatus 111 in a calibration area 110 to read the reference signal of the reference apparatus 111.

In step S303, the wireless transceiver 103 of the wireless batch calibration apparatus 100 wirelessly connects to the to-be-calibrated devices 113a~113n in the calibration area 110 and reads to-be-calibrated signals of the to-be-calibrated devices 113a~113n.

In step S305, the processor circuit 101 of the wireless batch calibration apparatus 100 estimates a compensation value for each to-be-calibrated device 113a-113n according to the reference signal and the to-be-calibrated signal of each to-be-calibrated device 113a~113n. Then, the processor circuit 101 generates a compensation polynomial according to the compensation value and calibration precision, and establishes a calibration table.

The calibration table is established by the following flow. The processor circuit 101 records the MAC address of the reference apparatus 111, the reference signal, the MAC addresses of the to-be-calibrated devices 113a~113n, the to-be-calibrated signals, the compensation polynomial and information indicating whether the to-be-calibrated device has completed the calibration to the field of MAC addresses, the field of signal parameters, the field of compensation polynomials and the field of complete calibrations of the calibration table, respectively. In one embodiment, the field of complete calibrations corresponding to each to-be-calibrated device 113a~413n stores data of "N", which means that each to-be-calibrated device 113a~413n has not completed the calibration procedure.

In one embodiment, the processor circuit 101 records and updates the names of the reference apparatus 111 and the to-be-calibrated devices 113a~413n in the calibration table.

In step S307, the wireless batch calibration apparatus 100 executes the calibration procedure, which comprises the following steps:

The wireless batch calibration apparatus 100 writes the compensation polynomial of each to-be-calibrated device 113a~113n and a setting bit back to each to-be-calibrated device 113a~113n. The wireless batch calibration apparatus 100 then calibrates each to-be-calibrated device 113a~413n and updates the field of complete calibrations corresponding to each to-be-calibrated device 113a~413n. The wireless batch calibration apparatus 100 calibrates the to-be-calibrated device indicating by the field of complete calibrations storing data of "N".

In step S307, if the wireless batch calibration apparatus 100 does not write the compensation polynomial of each to-be-calibrated device 113a~413n and a setting bit back to each to-be-calibrated device 113a~413n successfully, the field of complete calibrations corresponding to the to-be-calibrated device 113a~413n stores data of "N". If the wireless batch calibration apparatus 100 writes the compensation polynomial of each to-be-calibrated device 113a~113n and a setting bit back to each to-be-calibrated device 113a~113n, the field of complete calibrations corresponding to the to-be-calibrated device 113a~113n stores data of "Y".

During the step in which the wireless batch calibration apparatus 100 writes the compensation polynomial of each to-be-calibrated device 113a~113n and a setting bit back to each to-be-calibrated device 113a~113n, the wireless batch calibration apparatus 100 simultaneously writes the compensation polynomial of each to-be-calibrated device 113a~113n and the setting bit back to each to-be-calibrated device according to the field of MAC addresses, the field of compensation polynomials and the field of complete calibrations of the calibration table, and updates the calibration table. The wireless batch calibration apparatus 100 can simultaneously calibrate at least two of the to-be-calibrated devices 113a~113n or sequentially calibrate the to-be-calibrated devices 113a~113n. Thus, the wireless batch calibration apparatus 100 can achieve batch calibration applied to the to-be-calibrated devices 113a~113n.

In step S309, the wireless batch calibration apparatus 100 determines whether there is any to-be-calibrated device that needs to be calibrated according to the calibration table. The wireless batch calibration apparatus 100 determines whether there is any to-be-calibrated device that needs to be calibrated according to the field of complete calibrations of the calibration table. If there is a to-be-calibrated device that needs to be calibrated, the procedure returns to step S307. If there is no to-be-calibrated device that needs to be calibrated, the procedure ends.

Figure 4:
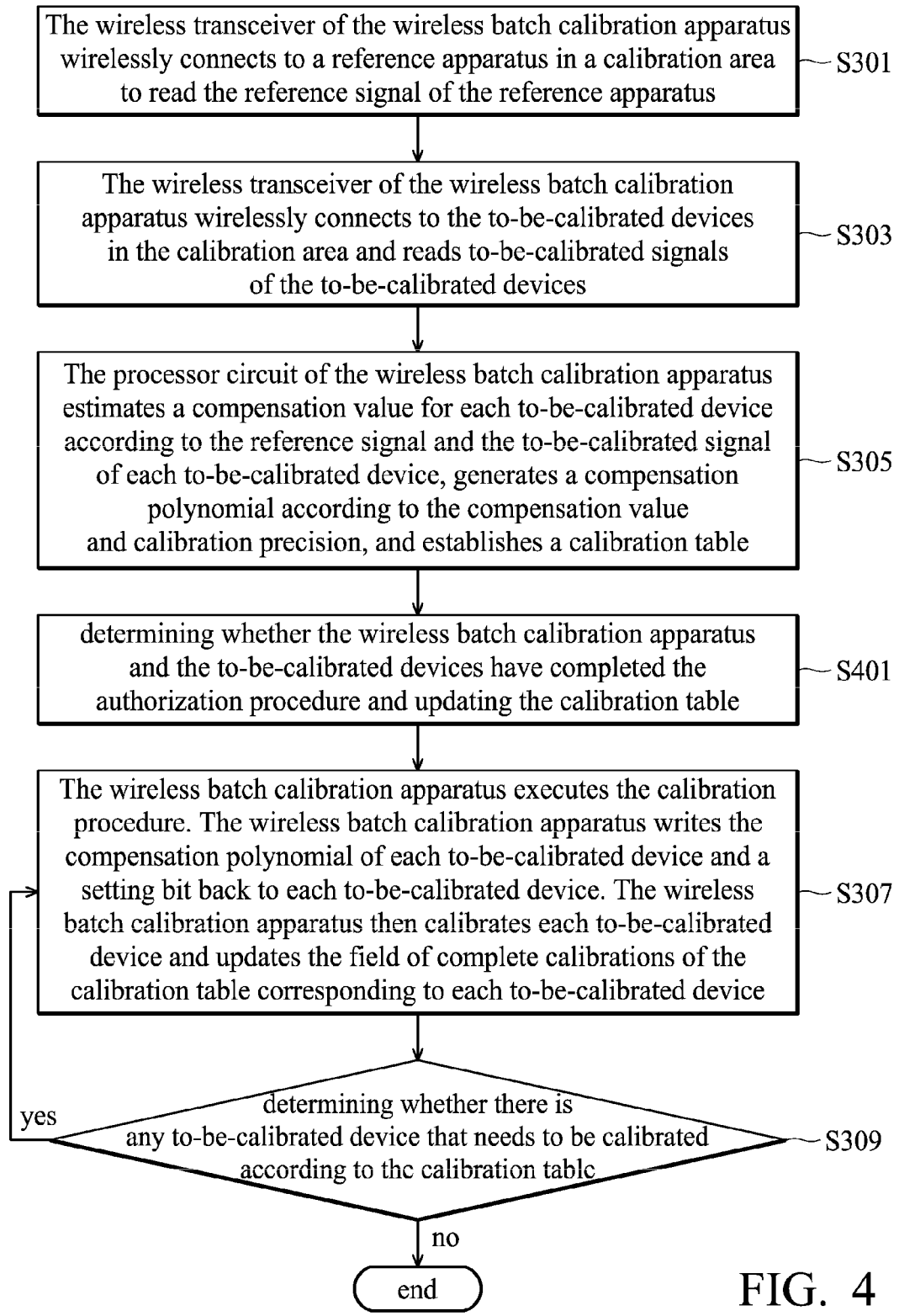
FIG. 4 is a flow chart of a wireless batch calibration method according to another embodiment of the disclosure.

FIG. 4 is a flow chart of a wireless batch calibration method according to another embodiment of the disclosure. Please refer to FIG. 3 and FIG. 4 at the same time. Note that steps S301~S305 and S307~S309 shown in FIG. 4 are the same as steps S301~S305 and S307~S309 shown in FIG. 3, and are not described here for brevity. As shown in FIG. 4, to avoid the to-be-calibrated device being illegally written, step S401 is executed before step S307 is executed. In step S401, it is determined whether the wireless batch calibration apparatus 100 and the to-be-calibrated devices 113a~113n have completed the authorization procedure and updated the calibration table. When the to-be-calibrated devices 113a~413n complete the authorization procedure, the field of complete calibrations corresponding to the to-be-calibrated devices 113a~413n stores data of "N". On the contrary, when the to-be-calibrated devices 113a~413n fail to complete the authorization procedure, the field of complete calibrations corresponding to the to-be-calibrated devices 113a~413n stores data of "Y". When the wireless batch calibration apparatus 100 and the to-be-calibrated devices 113a~413n complete the authorization procedure, the to-be-calibrated devices 113a~413n allow the wireless batch calibration apparatus 100 to write the compensation polynomial and the setting bit back to each of the to-be-calibrated devices 113a~413n.

In one embodiment, the authorization procedure between the wireless batch calibration apparatus 100 and the to-be-calibrated devices 113a~413n is implemented by the wireless batch calibration apparatus 100 inputting a password to the to-be-calibrated devices 113a~413n.

Figure 5:
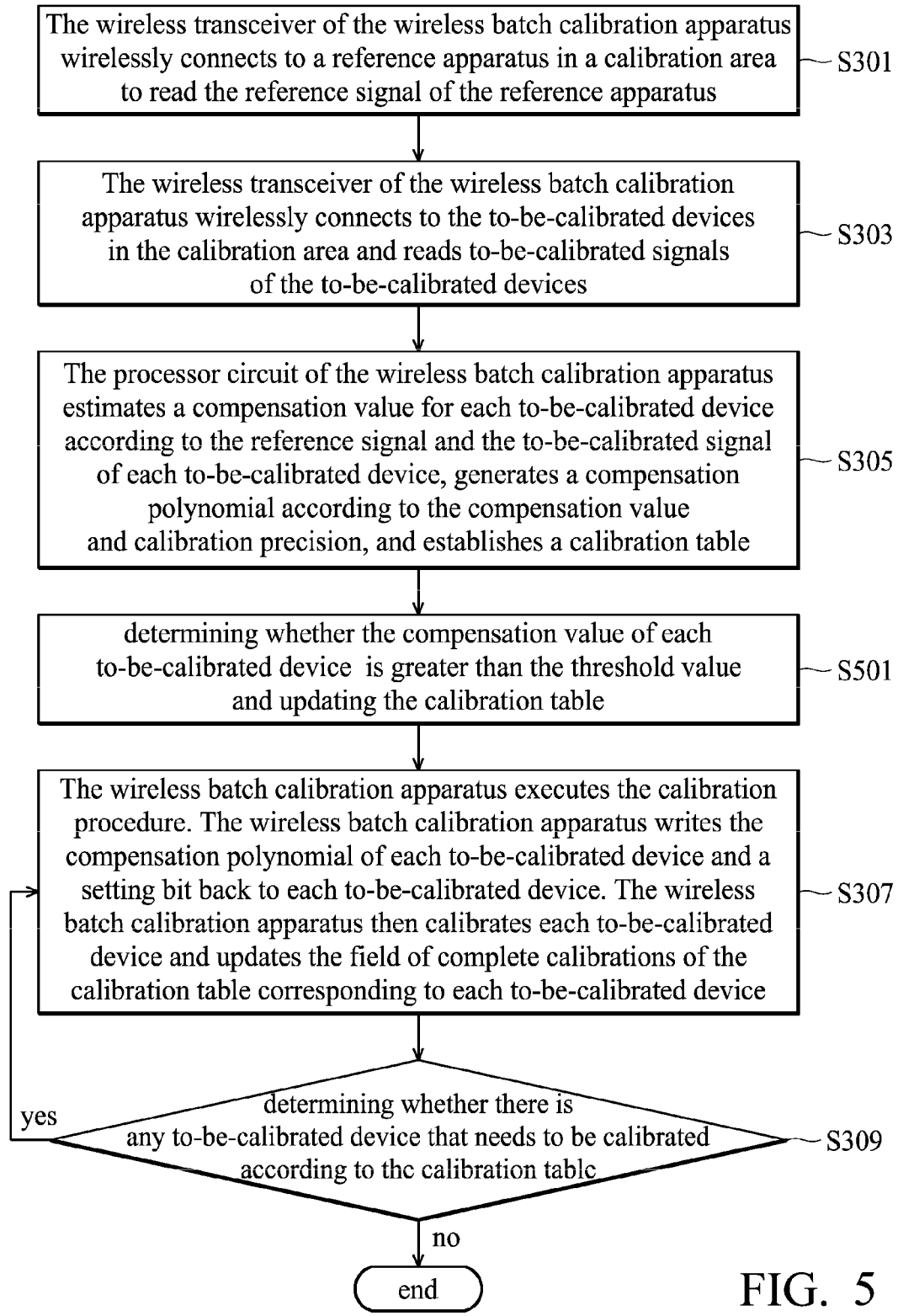
FIG. 5 is a flow chart of a wireless batch calibration method according to another embodiment of the disclosure.

FIG. 5 is a flow chart of a wireless batch calibration method according to another embodiment of the disclosure.

Please refer to FIG. 3 and FIG. 5 at the same time. Note that steps S301~S305 and S307~S309 shown in FIG. 5 are the same as steps S301~S305 and S307~S309 shown in FIG. 3, and are not described here for brevity. As shown in FIG. 5, in step S501, the processor circuit 101 sets a threshold value to determine whether the compensation value of each to-be-calibrated device 113a~413n is greater than the threshold value and updates the field of complete calibrations of the calibration table when the processor circuit 101 calculates the compensation value of each to-be-calibrated device 113a~113n according to the reference signal and each to-be-calibrated signal. When each to-be-calibrated device 113a~113n is greater than the threshold value, the field of complete calibrations corresponding to the to-be-calibrated devices 113a~413n stores data of "N". When each to-be-calibrated device 113a~413n is not greater than the threshold value, the field of complete calibrations corresponding to the to-be-calibrated devices 113a~413n stores data of "Y".

In one embodiment, step S501 of FIG. 5 can be combined with the wireless batch calibration method shown in FIG. 4. The combined wireless batch calibration method first executes step S401 to determine whether the wireless batch calibration apparatus 100 and the to-be-calibrated devices 113a~113n have completed the authorization procedure, and then execute step S501 to determine whether the compensation value of each to-be-calibrated device 113a~113n is greater than the threshold value.

Figure 6:
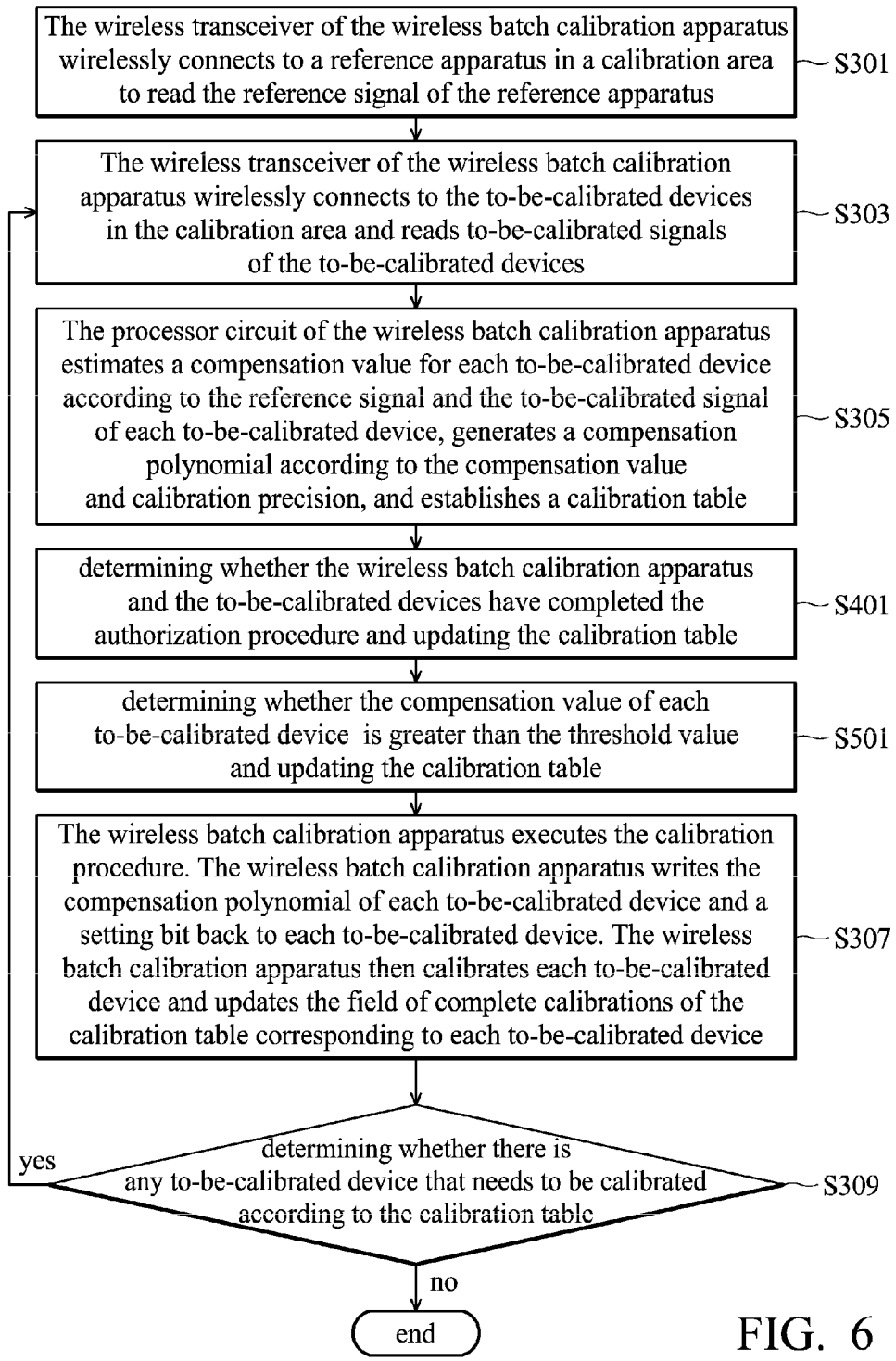
FIG. 6 is a flow chart of a wireless batch calibration method according to another embodiment of the disclosure.

FIG. 6 is a flow chart of a wireless batch calibration method according to another embodiment of the disclosure. Please refer to FIG. 3, FIG. 4, FIG. 5 and FIG. 6 at the same time. Steps S301~S305 and S307~S309 shown in FIG. 5 are the same as steps S301~S305 and S307~S309 shown in FIG. 3, steps S401 and S501 shown in FIG. 6 are the same as step S401 shown in FIG. 4 and step S501 shown in FIG. 5, and are not described here for brevity. As shown in FIG. 6, in step S309, the wireless batch calibration apparatus 100 determines whether there is any to-be-calibrated device that is not calibrated according to the field of complete calibrations of the calibration table. If there is at least one to-be-calibrated device that is not calibrated, the procedure returns to step S303. The wireless batch calibration apparatus 100 wirelessly connects to a plurality of to-be-calibrated devices 113a~413n again to read the new to-be-calibrated signals of the to-be-calibrated device 113a~413n. Then, the wireless batch calibration apparatus 100 calculates the compensation value of each to-be-calibrated device 113a~113n according to the reference signal and the new to-be-calibrated signal of each to-be-calibrated device 113a~413n. If all the to-be-calibrated devices 113a~113n have completed the calibration procedure, the procedure ends.

In another embodiment, the wireless batch calibration method shown in FIG. 6 can be combined with the wireless batch calibration method shown in FIG. 4. The combined wireless batch calibration method executes step S401 to determine whether the wireless batch calibration apparatus 100 and the to-be-calibrated devices 113a~113n have completed an authorization procedure after step S305. In another embodiment, the wireless batch calibration method shown in FIG. 6 can be combined with the wireless batch calibration method shown in FIG. 5. The combined wireless batch calibration method executes step S501 to determine whether the compensation value of each to-be-calibrated device 113a~413n is greater than the threshold value after step S305. In another embodiment, the wireless batch calibration method shown in FIG. 6 can be combined with the wireless batch calibration methods shown in FIG. 4 and FIG. 5. The combined wireless batch calibration method first executes step S305, and then executes step S401 and S501.

Figure 7:
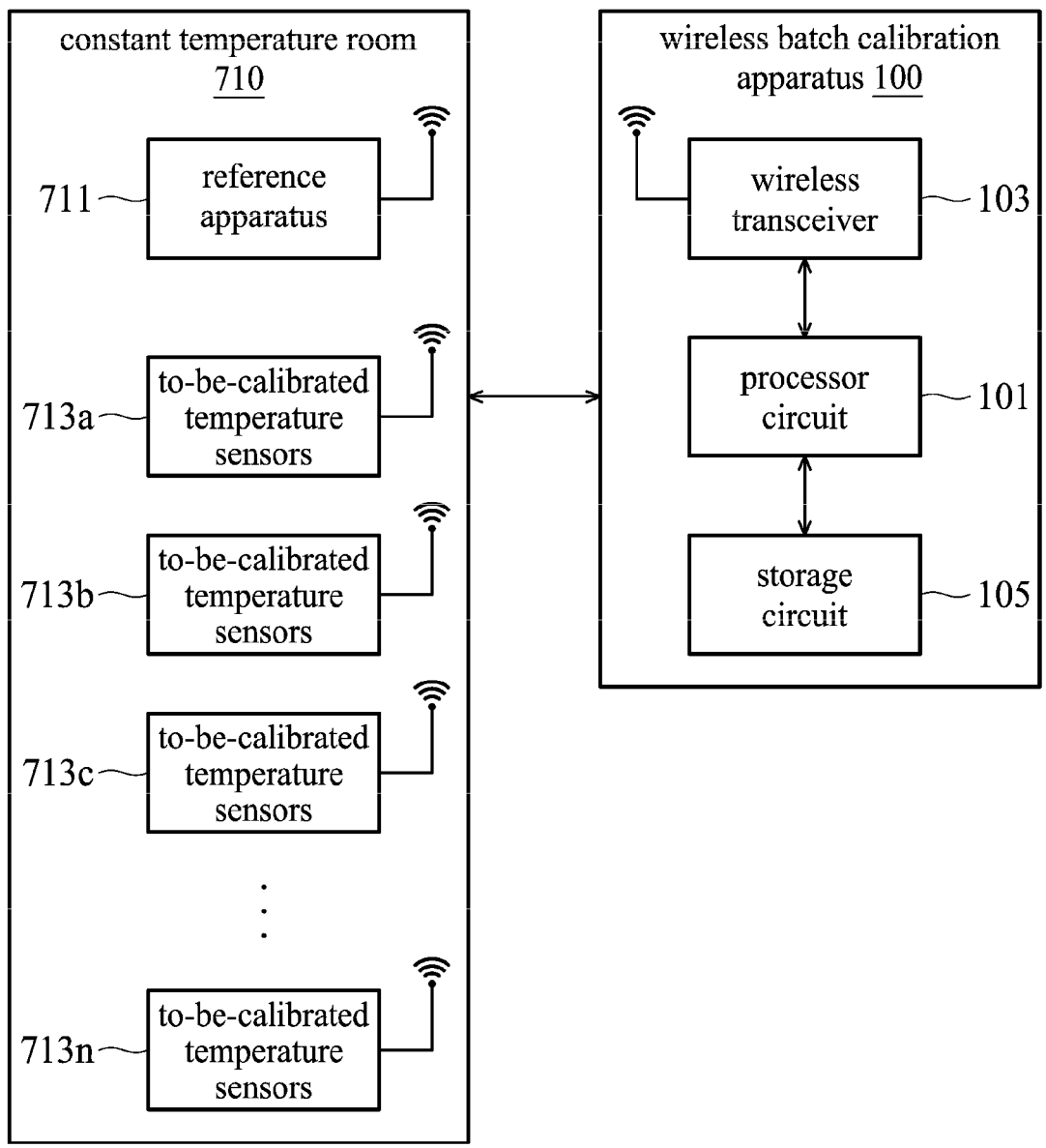
FIG. 7 is a schematic diagram of a wireless batch calibration temperature sensor according to an embodiment of the disclosure.

FIG. 7 is a schematic diagram of a wireless batch calibration temperature sensor according to an embodiment of the disclosure.

Please refer to FIG. 7. The embodiment illustrates a to-be-calibrated product with a temperature sensor. The calibration area is a constant temperature room 710.

The wireless transceiver 103 of the wireless batch calibration apparatus 100 wirelessly connects to the reference apparatus 711 and the to-be-calibrated temperature sensors 713a~713n within the constant temperature room 710 to receive a reference temperature signal from the reference apparatus 711 and to-be-calibrated temperature signals from the to-be-calibrated temperature sensors 713a~713n.

The processor circuit 101 of the wireless batch calibration apparatus 700 calculates the compensation value of each to-be-calibrated temperature sensor 713a~713n according to the reference temperature signal and the to-be-calibrated temperature signal of each to-be-calibrated temperature sensors 713a~713n. The processor circuit 101 generates a compensation polynomial of each of the to-be-calibrated temperature sensors 713a~713n according to the compensation value of each to-be-calibrated temperature sensor 713a~713n and a calibration precision. In one embodiment, if the calibration error of each to-be-calibrated temperature sensor 713a~713n is 0.1°, the calibration precision X is set to 0.1. The processor circuit 101 calculates the compensation value of each to-be-calibrated temperature sensor 713a~713n by subtracting the reference temperature signal from the to-be-calibrated temperature signal. The processor circuit 101 generates the compensation polynomial of each of the to-be-calibrated temperature sensors 713a~713n according to the compensation value of each to-be-calibrated temperature sensor 713a~713n and the calibration precision, writes the compensation polynomial and a setting bit back to the to-be-calibrated temperature sensors 713a~713n to complete the calibration of each to-be-calibrated temperature sensor 713a~713n, and updates the calibration table. Thus, the wireless batch calibration apparatus 100 can achieve batch calibration applied to the to-be-calibrated temperature sensor 713a~713n.

In another embodiment, the wireless batch calibration apparatus 100 can calibrate humidity sensors, and the calibration area is a constant humidity room. The wireless batch calibration apparatus 100 batch calibrates a plurality of humidity sensors according to a reference humidity signal of a reference humidity sensor.

According to the described embodiment, the present disclosure provides a wireless batch calibration apparatus to calculate the compensation polynomial of each to-be-calibrated device and establish a calibration table. The wireless batch calibration apparatus calibrates the to-be-calibrated devices according to the calibration table and the compensation polynomial of each to-be-calibrated device to increase the calibration efficiency.

Those with skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Persons skilled in the art will also appreciate that the various illustrative logical blocks, modules, processors, means, circuits, and algorithm steps described in connection with the aspects disclosed herein may be implemented as electronic hardware (e.g. a digital implementation, an analog implementation, or a combination of the two, which may be designed using source coding or some other technique), various forms of program or design code incorporating instructions (which may be referred to herein, for convenience, as "software" or a "software module"), or a combination of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

It is understood that any specific order or hierarchy of steps in any disclosed process is an example of a sample approach. Based upon design preferences, it should be understood that the specific order or hierarchy of steps in the processes may be rearranged while remaining within the scope of the present disclosure. The accompanying method claims present elements of the various steps in a sample order, and are not meant to be limited to the specific order or hierarchy presented.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A wireless batch calibration apparatus, comprising:
a wireless transceiver wirelessly connected to a reference apparatus and a plurality of to-be-calibrated devices in a calibration area, to receive a reference signal of the reference apparatus and a to-be-calibrated signal of each to-be-calibrated device;
a processor circuit coupled to the wireless transceiver to calculate a compensation value of each of the to-be-calibrated devices according to the reference signal and the to-be-calibrated signal, to generate a compensation polynomial according to the compensation value and a calibration precision of each to-be-calibrated device, and to establish a calibration table to write the compensation polynomial of each of the to-be-calibrated devices and a setting bit back to each to-be-calibrated device; and
a storage circuit coupled to the processor circuit to store the calibration table;
wherein the calibration table comprises a field of MAC addresses, a field of signal parameters, a field of compensation polynomials and a field of complete calibrations.

2. The wireless batch calibration apparatus as claimed in claim 1, wherein the processor circuit records a MAC address of the reference apparatus and the MAC addresses of the to-be-calibrated devices to the field of MAC addresses, the reference signal and the to-be-calibrated signal to the field of signal parameters, the compensation polynomial to the field of compensation polynomials, and information indicating whether the to-be-calibrated device has completed the calibration to the field of complete calibrations.

3. The wireless batch calibration apparatus as claimed in claim 2, wherein the setting bit is an enable bit, and the wireless batch calibration apparatus simultaneously writes the compensation polynomial of each to-be-calibrated device and the setting bit back to each to-be-calibrated device to update the calibration table.

4. The wireless batch calibration apparatus as claimed in claim 3, wherein after each to-be-calibrated device receives the compensation polynomial of each to-be-calibrated device and the setting bit, each to-be-calibrated device executes a compensation calibration procedure according to the setting bit, the compensation value of the compensation polynomial, and the to-be-calibrated signal of each to-be-calibrated device.

5. The wireless batch calibration apparatus as claimed in claim 2, wherein before writing the compensation polynomial of each to-be-calibrated device and the setting bit back to each to-be-calibrated device, the wireless batch calibration apparatus completes an authorization procedure with each of the to-be-calibrated devices and updates the field of complete calibrations of the calibration table.

6. The wireless batch calibration apparatus as claimed in claim 5, wherein after the wireless batch calibration apparatus completes an authorization procedure with each of the to-be-calibrated devices, the wireless batch calibration apparatus further determines whether the compensation value of each to-be-calibrated device is greater than a threshold value.

7. The wireless batch calibration apparatus as claimed in claim 2, wherein when the processor circuit calculates the compensation value of each to-be-calibrated device according to the reference signal and the to-be-calibrated signal, the processor circuit determines whether the compensation value of each to-be-calibrated device is greater than a threshold value, and updates the field of complete calibrations of the calibration table.

8. A wireless batch calibration method for a wireless batch calibration apparatus, comprising:
wirelessly connecting to a reference apparatus in a calibration area to read a reference signal of the reference apparatus;
wirelessly connecting to a plurality of to-be-calibrated devices in the calibration area to read a to-be-calibrated signal of each to-be-calibrated device;
estimating a compensation value of each to-be-calibrated device according to the reference signal and the to-be-calibrated signal of each to-be-calibrated device, generating a compensation polynomial according to the compensation value and a calibration precision of each to-be-calibrated device, and establishing a calibration table;
writing the compensation polynomial of each to-be-calibrated device and a setting bit back to each to-be-calibrated device; and
determining whether any of the to-be-calibrated devices is not calibrated according to the calibration table;
wherein the calibration table comprises a field of MAC addresses, a field of signal parameters, a field of compensation polynomials and a field of complete calibrations.

9. The wireless batch calibration method as claimed in claim 8, wherein the step of determining whether any of the to-be-calibrated devices is not calibrated according to the calibration table further comprises:
returning to step of writing the compensation polynomial of each to-be-calibrated device and the setting bit back to each to-be-calibrated device when at least one of the to-be-calibrated devices is not calibrated according to a field of complete calibrations of the calibration table.

10. The wireless batch calibration method as claimed in claim 8, further comprising:
recording a MAC address of the reference apparatus and the MAC addresses of the to-be-calibrated devices to the field of MAC addresses, the reference signal and the to-be-calibrated signal to the field of signal parameters, the compensation polynomial to the field of compensation polynomials, and information indicating whether the to-be-calibrated device has completed the calibration to the field of complete calibrations.

11. The wireless batch calibration method as claimed in claim 10, wherein during the step of writing the compensation polynomial of each to-be-calibrated device and the setting bit back to each to-be-calibrated device, the setting bit is an enable bit, and the compensation polynomial of each to-be-calibrated device and the setting bit back to each to-be-calibrated device are written back to each to-be-calibrated device to update the calibration table.

12. The wireless batch calibration method as claimed in claim 11, wherein after each to-be-calibrated device receives the compensation polynomial of each to-be-calibrated device and the setting bit, each to-be-calibrated device executes a compensation calibration procedure according to the setting bit, the compensation value of the compensation polynomial, and the to-be-calibrated signal of each to-be-calibrated device.

13. The wireless batch calibration method as claimed in claim 10, further comprising determining whether each to-be-calibrated device is authorized by the wireless batch calibration apparatus and updating the field of complete calibrations of the calibration table before the step of writing the compensation polynomial of each to-be-calibrated device and the setting bit back to each to-be-calibrated device.

14. The wireless batch calibration method as claimed in claim 13, further comprising determining whether the compensation value of each to-be-calibrated device is greater than a threshold value after step of determining whether each to-be-calibrated device is authorized by the wireless batch calibration apparatus.

15. The wireless batch calibration method as claimed in claim 10, wherein the step of estimating a compensation value of each to-be-calibrated device according to the reference signal and the to-be-calibrated signal of each to-be-calibrated device further comprises step of determining whether the compensation value of each to-be-calibrated device is greater than a threshold value, and updating the field of complete calibrations of the calibration table.

16. The wireless batch calibration method as claimed in claim 8, wherein the step of determining whether any of the to-be-calibrated devices is not calibrated according to the calibration table further comprises:
    returning to step of wirelessly connecting to the plurality of to-be-calibrated devices in the calibration area to read a second to-be-calibrated signal of each to-be-calibrated device when at least one of the to-be-calibrated devices is not calibrated according to a field of complete calibrations of the calibration table.

17. A wireless batch calibration system, comprising:
    a reference apparatus and a plurality of to-be-calibrated devices in a calibration area; and
    a wireless batch calibration apparatus wirelessly connected to the reference apparatus and the to-be-calibrated devices within the calibration area, wherein the wireless batch calibration apparatus comprises:
        a wireless transceiver to receive a reference signal of the reference apparatus and a to-be-calibrated signal of each to-be-calibrated device;
        a processor circuit coupled to the wireless transceiver to calculate a compensation value of each to-be-calibrated device according to the reference signal and the to-be-calibrated signal, to generate a compensation polynomial according to the compensation value and a calibration precision of each to-be-calibrated device, and to establish a calibration table to write the compensation polynomial of each to-be-calibrated device and a setting bit back to each to-be-calibrated device; and
        a storage circuit coupled to the processor circuit to store the calibration table;
    wherein the calibration table comprises a field of MAC addresses, a field of signal parameters, a field of compensation polynomials and a field of complete calibrations.

18. The wireless batch calibration system as claimed in claim 17, wherein the processor circuit records a MAC address of the reference apparatus and the MAC addresses of the to-be-calibrated devices to the field of MAC addresses, the reference signal and the to-be-calibrated signal to the field of signal parameters, the compensation polynomial to the field of compensation polynomials, and information indicating whether the to-be-calibrated device has completed the calibration to the field of complete calibrations.

19. The wireless batch calibration system as claimed in claim 18, wherein the setting bit is an enable bit, and the wireless batch calibration apparatus simultaneously writes the compensation polynomial of each to-be-calibrated device and the setting bit back to each to-be-calibrated device to update the calibration table.

20. The wireless batch calibration system as claimed in claim 19, wherein after each to-be-calibrated device receives the compensation polynomial of each to-be-calibrated device and the setting bit, each to-be-calibrated device executes a compensation calibration procedure according to the setting bit, the compensation value of the compensation polynomial, and the to-be-calibrated signal of each to-be-calibrated device.

21. The wireless batch calibration system as claimed in claim 18, wherein before writing the compensation polynomial of each to-be-calibrated device and the setting bit back to each to-be-calibrated device, the wireless batch calibration apparatus completes an authorization procedure with each to-be-calibrated device and updates the field of complete calibrations of the calibration table.

22. The wireless batch calibration system as claimed in claim 21, wherein after the wireless batch calibration apparatus completes the authorization procedure with each to-be-calibrated device, the wireless batch calibration apparatus further determines whether the compensation value of each to-be-calibrated device is greater than a threshold value.

23. The wireless batch calibration system as claimed in claim 18, wherein when the processor circuit calculates the compensation value of each to-be-calibrated device according to the reference signal and the to-be-calibrated signal, the processor circuit determines whether the compensation value of each to-be-calibrated device is greater than a threshold value, and updates the field of complete calibrations of the calibration table.

* * * * *